United States Patent
Monreal Lesmes et al.

(10) Patent No.: US 11,786,999 B2
(45) Date of Patent: Oct. 17, 2023

(54) METHOD AND APPARATUS FOR THE PRE-TENSIONING OF BOLTS

(71) Applicant: NABRAWIND TECHNOLOGIES, S.L., Pamplona (ES)

(72) Inventors: Javier Monreal Lesmes, Zizur Mayor (ES); Javier Callen Escartin, Huesca (ES); Javier Iriarte Eleta, Zizur Mayor (ES); Eneko Sanz Pascual, Pamplona (ES)

(73) Assignee: NABRAWIND TECHNOLOGIES, S.L., Pamplona (ES)

( * ) Notice: Subject to any disclaimer, the term of this patent is extended or adjusted under 35 U.S.C. 154(b) by 486 days.

(21) Appl. No.: 16/908,031

(22) Filed: Jun. 22, 2020

(65) Prior Publication Data
US 2020/0316733 A1 Oct. 8, 2020

Related U.S. Application Data

(63) Continuation of application No. PCT/ES2017/070853, filed on Dec. 27, 2017.

(51) Int. Cl.
*B23P 19/06* (2006.01)
*B25B 29/02* (2006.01)
*F16B 31/04* (2006.01)

(52) U.S. Cl.
CPC ............ *B23P 19/067* (2013.01); *B25B 29/02* (2013.01); *F16B 31/043* (2013.01)

(58) Field of Classification Search
CPC ....... B23P 19/067; B25B 29/02; F16B 31/043
(Continued)

(56) References Cited

U.S. PATENT DOCUMENTS 3,015,975 A * 1/1962 Biach .................. B25B 29/02
81/57.38
4,010,669 A * 3/1977 Kloren ................ F16B 39/028
411/536

(Continued)

FOREIGN PATENT DOCUMENTS

EP 3441561 A1 2/2019
ES 2220182 A1 12/2004
(Continued)

OTHER PUBLICATIONS

International Search Report received in international application No. PCT/ES2017/070853 dated Aug. 1, 2018 (2 pages).

*Primary Examiner* — Hadi Shakeri
(74) *Attorney, Agent, or Firm* — Maier & Maier PLLC

(57) ABSTRACT

A method and apparatus for pre-tensioning a bolt that joins two parts, each end of the bolt being threaded into a respective cavity of the two parts. According to one embodiment, the bolt including a double wedge pre-tensioning element, a washer disposed at each side of the double wedge and clamping elements fastening the wedges once the desired preloading has been attained. The bolt is pre-tensioned with a tensioning tool which acts on the pre-tensioning element, reducing a distance between the wedges while increasing the distance between the two parts to be joined and reducing a distance between the outer facing surfaces of the wedges and washers. The control system measures at least one of the distances described, with the tensioning tool acting in accordance with the measured distance.

21 Claims, 7 Drawing Sheets

(58) Field of Classification Search
USPC .......................................................... 81/57.38
See application file for complete search history.

(56) References Cited

U.S. PATENT DOCUMENTS

| | | | | |
|---|---|---|---|---|
| 5,842,263 | A * | 12/1998 | Gosling | .................. F16B 39/20 |
| | | | | 81/57.38 |
| 7,077,031 | B1 * | 7/2006 | Frederiksen | .......... B23P 19/069 |
| | | | | 81/57.32 |
| 8,381,619 | B2 * | 2/2013 | Hung | ...................... B25B 17/02 |
| | | | | 81/57.32 |
| 10,584,677 | B2 * | 3/2020 | Sanz Pascual | ........ F03D 1/0683 |
| 11,466,711 | B2 * | 10/2022 | Hohmann | ................ B25B 17/00 |
| 2009/0013518 | A1 | 1/2009 | Monville | |

FOREIGN PATENT DOCUMENTS

| | | | | |
|---|---|---|---|---|
| ES | 2277506 | A1 | 7/2007 | |
| ES | 1072452 | U | 7/2010 | |
| ES | 2490315 | T3 | 9/2014 | |
| WO | WO-2013117911 | A1 * | 8/2013 | ............ F16B 31/043 |
| WO | 2014122356 | A1 | 8/2014 | |
| WO | 2017174828 | A1 | 10/2017 | |

* cited by examiner

METHOD AND APPARATUS FOR THE PRE-TENSIONING OF BOLTS

CROSS-REFERENCE TO RELATED APPLICATIONS

This application relates to and claims the benefit and priority to International Application No. PCT/ES2017/070853, filed Dec. 27, 2017, which is incorporated by reference herein in its entirety.

FIELD

The invention relates to a control system for the pre-tensioning of bolts.

BACKGROUND

Bolts are one of the most common means of joining two or more components. In most applications, it is highly important for them to be uniformly tightened so as to achieve an adequate level of tension in the bolt, and this requires the use of control equipment and suitable tools.

There are various tensioning techniques which may be classified according to how the tightening in the part being pre-tensioned is controlled. Pre-tensioning may be gauged on a single bolt or over a plurality of bolts.

Depending on the control technique used, we may distinguish between the following methods, shown in FIGS. 1A and 1B, in the state of the art.
  (i) Control of tightening torque. During the tightening of the bolt or screw, torque is gauged by means of monitoring tightening tension. This is also combined with measurement of the angle of rotation.
  (ii) Control of torque-to-yield stretch. Where the point between the elastic and plastic domains is attained.
  (iii) Control of axial load. Elongating the bolt prior to tightening the nut.
  (iv) Control of stretch by heating and expanding the bolt and/or the nut or the parts to be joined prior to tightening.

However, when there is limited accessibility to the bolt, none of the above control methods is applicable.

In the state of the art there are bolt torque tensioning tools with specific controls. Such is the case of utility model ES1072452 U, wherein the tightening tip turns and causes relative displacement in the elements to be tightened by reducing the distance between two clasps until the contact between them stops the turning. In this case, the clasps may also be replaced by contact sensors. The patent applications published as ES2220182A1 and ES2277506A1 use a load sensor for gauging and control which detects the clamping force applied in the constriction of the elements to be joined and a torque-measuring system based on strain gauges and a gauge of the distance travelled by the fingers of the tool using a magnetic displacement sensor.

Document WO2017174828A1 describes how two parts or modules are joined using bolts pre-tensioned with a tensioning tool. The ends of each bolt are threaded and then inserted and threaded into respective cavities in the parts to be joined. The bolt comprises a pre-tensioning element in the form of a double pre-tensioning wedge. On either side of the double wedge there is a washer resting on the double wedge through one respective slanting side. The pre-tensioning element also comprises clamping elements. When an external load is applied, the distance between wedges in the double wedge is reduced, increasing the distance between the parts to be joined and reducing the distance between the ends of the wedges and the washers, resulting in the preloading or tensioning of the bolt.

SUMMARY

Provided is a control system for the pre-tensioning of bolts.

In the control system, each end of each bolt is threaded into a respective cavity of the two parts to be joined. Each bolt in turn comprises a pre-tensioning element for pre-tensioning the bolt. This pre-tensioning element comprises a double wedge consisting of two wedges located about the bolt, a washer disposed on either side of the double wedge resting on the double wedge through one respective slanting side, and clamping elements that clamp the wedges of the double wedge once the desired preloading has been achieved. The relevant bolt is pre-tensioned with a tensioning tool that acts on the pre-tensioning element, reducing the distance between the wedges of the double wedge, increasing the distance between the parts to be joined for pre-tensioning, and reducing the distance between the ends of the wedges and the washers.

In the control system, however, at least one of the distances described, which vary during the tightening of the bolt, is measured, with the tensioning tool acting according to this distance measured.

As mentioned above, the two ends of the bolt to be tensioned are threaded into cavities located in the interior of the parts to be joined and which are inaccessible. Hence neither the tightness nor the angle of rotation can be controlled by the previously described state of the art methods shown in FIGS. 1A and 1B. Nor may torque-to-yield stretch be controlled, as this would involve previously gauging the angle of rotation and torque. Moreover, if a plurality of bolts were arranged in parallel and in close proximity, their lateral accessibility would also be limited.

With the control system of the invention it is therefore possible for bolts to be properly tensioned even where the access to the bolts is limited or hampered, thereby preventing the bolts in question from becoming overly deformed or undergoing plastic deformation.

BRIEF DESCRIPTION OF THE DRAWINGS

Below is briefly described a series of drawings to assist in understanding the invention, expressly linked to an embodiment of the invention presented as an example thereof though without limitation.

DETAILED DESCRIPTION

Figure 1A:
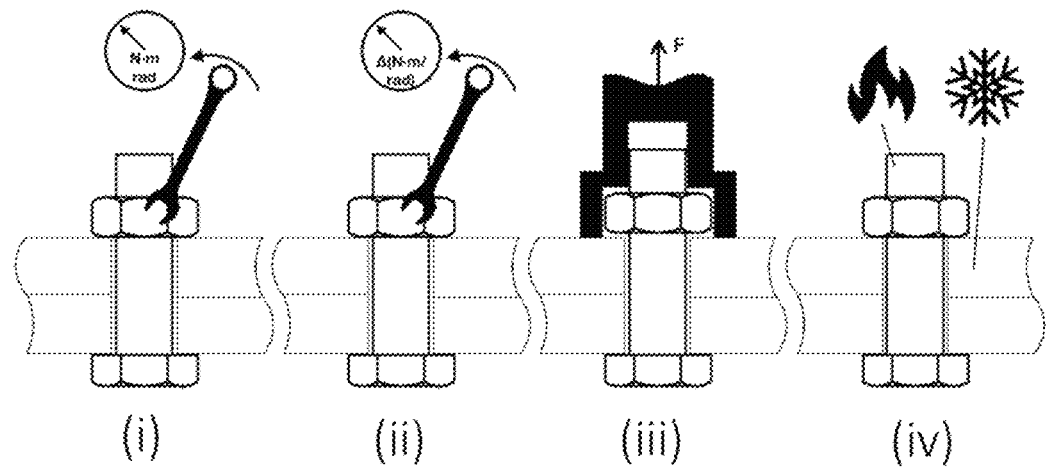
FIGS. 1A and 1B show existing tensioning control techniques in the state of the art.
Figure 1B:
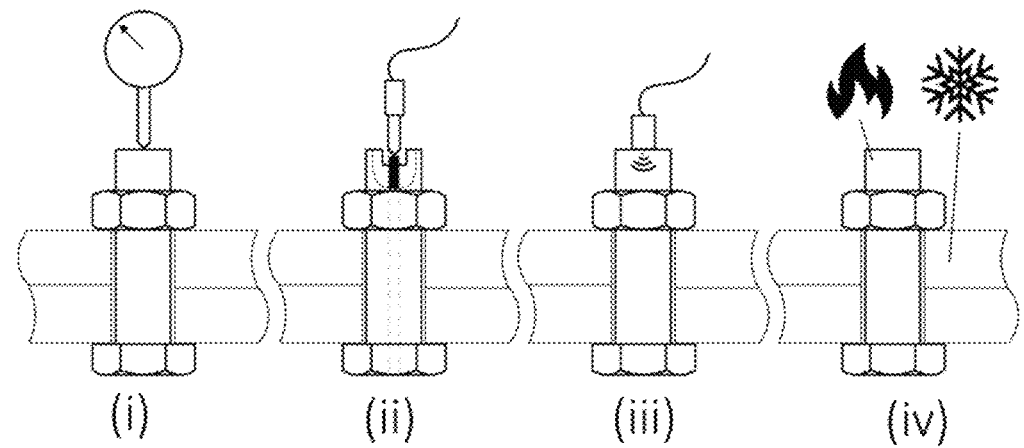
Figure 2A:
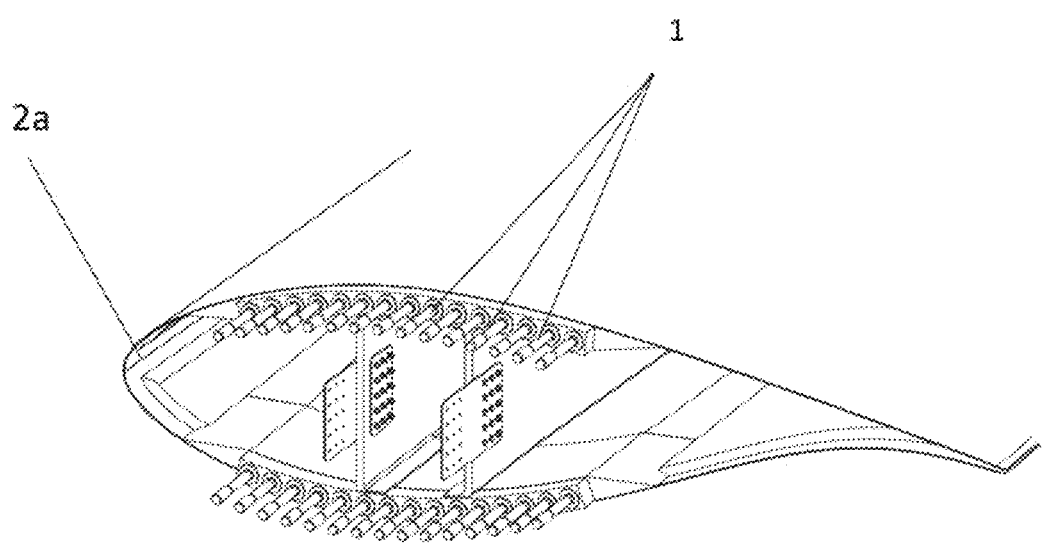
FIG. 2A shows an arrangement of bolts along a modular turbine blade.

FIG. 2A shows a first part 2a to be joined to and a second part 2b which, once joined, will form a wind turbine blade (as an example). The two halves 2a and 2b are joined with a plurality of bolts 1, as shown in the FIGS. 2A and 2B. The use of such bolts in joining the parts of a modular blade is described, for example, in WO2017174828A 1.

Figure 3A:
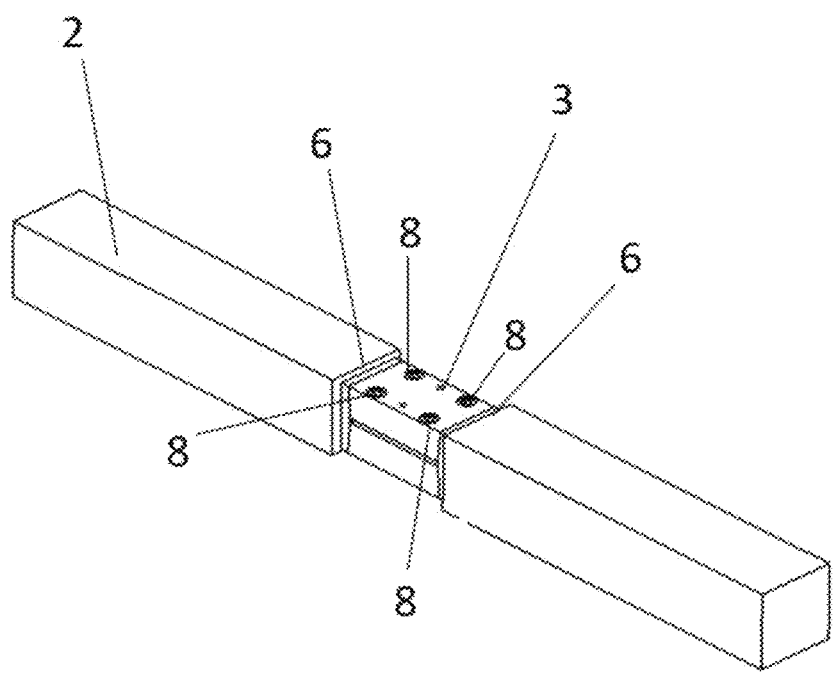
FIG. 3A shows a blade joint.
Figure 3B:
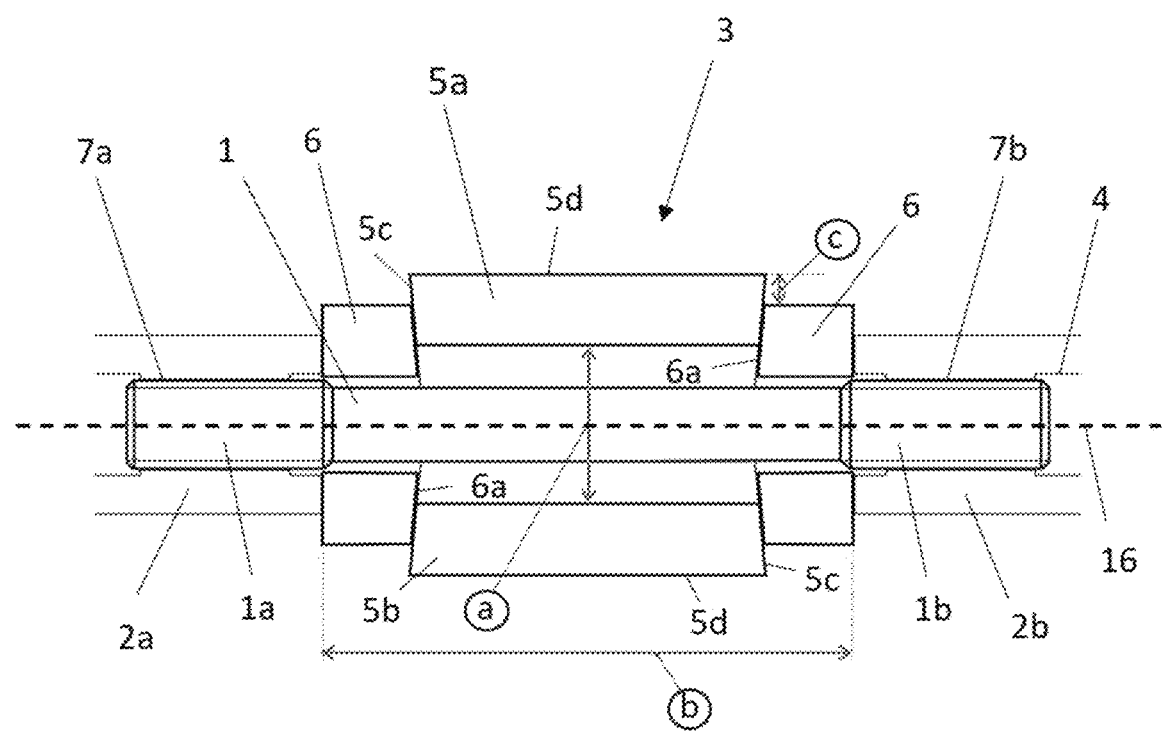
FIG. 3B shows a cross-section of the blade joint with a single pre-tensioning element, the pre-tensioning element and the bolt inside, in a lengthwise cross-section.

According to one embodiment, each end of the bolt 1 is threaded into a respective insert 7 located in a respective cavity 4 of the two parts 2a and 2b to be joined, as shown for example, in FIGS. 3A and 3B. As shown in FIG. 3B, the bolt 1 has a longitudinal axis 16, a first threaded end 1a of bolt 1 is in threaded engagement with a threaded insert 7a of the first part 2a, and a second threaded end 1b of bolt 1 is in threaded engagement with a threaded insert 7b of the first part 2b.

A pre-tensioning element 3 is provided for pre-tensioning the bolt 1. The pre-tensioning element 3 comprises a double wedge 5 formed by two wedges 5a and 5b located on opposite sides of the bolt 1, a washer 6 disposed on either side of the double wedge 5 which rests on the double wedge 5 through one respective slanting side 5c, and clamping elements 8 that clamp the double wedge 5 to hold the wedges 5a and 5b in place once the desired preloading is attained. As will be discussed in more detail below, bolt 1 is pre-tensioned with a tensioning tool 10 which acts on the pre-tensioning element 3, reducing distance "a" between the wedges 5a and 5b of the double wedge 5, increasing distance "b" between parts 2a and 2b, pre-tensioning the corresponding bolt 1, and reducing distance "c" between the outer facing surfaces 5d of the wedges 5a and 5b and the outer facing surfaces 6b of the washers 6.

The control system of the invention measures at least one of the distances, "a", "b" or "c", which vary during the tightening or loading of the bolt 1, with the tensioning tool 10 acting according to the "a", "b" or "c" distance measured.

Figure 2B:
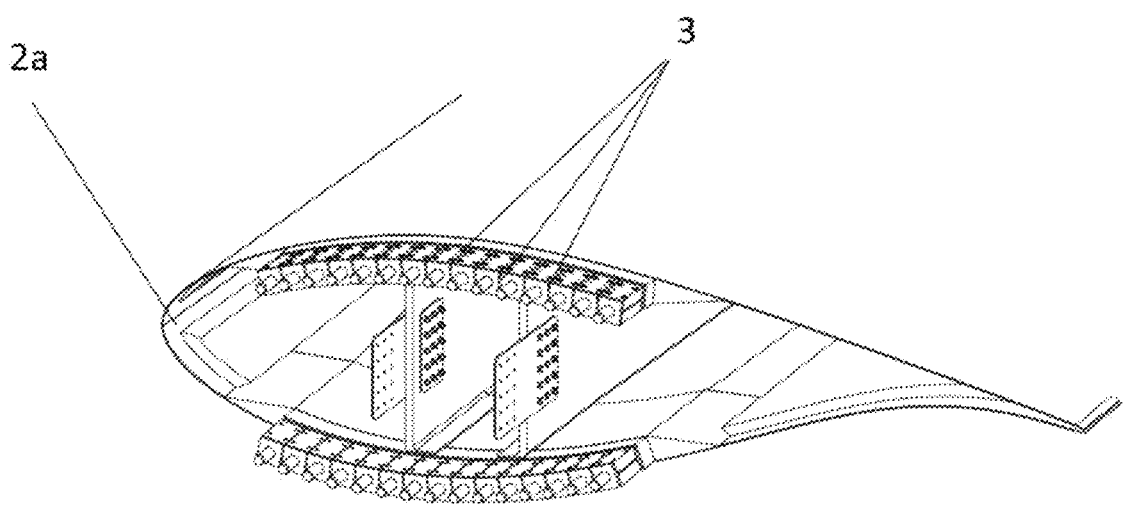
FIG. 2B shows the bolts of FIG. 2A with pre-tensioning elements fitted on them.

FIG. 2B shows the plurality of bolts 1 of FIG. 2A with the pre-tensioning elements 3 fitted about them. The protruding end of the bolt 1 shown in FIG. 2B is not visible when it is threaded into the blade part to be joined.

To facilitate assembly of the bolts 1 with the parts 2a and 2b to be joined, the two halves of the modular blade in this example, inserts 7a and 7b are fitted into the cavities 4 of the blades 2a and 2b. The inside of each of the inserts 7a and 7b is threaded so that the threaded end of each bolt 1 is threaded into a corresponding insert.

FIG. 3B shows a single bolt 1 with each end threaded into the inserts 7a and 7b located inside a respective blade part 2a and 2b, and as it is moreover covered by the pre-tensioning element 3, the bolt 1 is wholly inaccessible. In fact, as shown in FIG. 2A, there is a plurality of bolts 1 whose ends are threaded into the inserts 7a and 7b in the cavities 4, and moreover the pre-tensioning elements 3 cover the bolts 1.

Thus, the control system of the invention allows the bolts 1 to be properly pre-tensioned, even where the bolts 1 are inaccessible, thus preventing the bolt 1 in question from becoming overly deformed or undergoing plastic deformation.

As shown in FIG. 3B, when one of the bolts 1 is pre-tensioned, control parameters are obtained in the pre-tensioning element 3 through the displacement of its component parts: a double wedge 5 which is displaced on the slanting washers 6 pushed by the tensioning tool 10 applying force on the double wedge 5.

When the clamping force is applied to the double wedge 5, there may be displacement between wedges 5a and 5b and the washers 6, causing stretching in the corresponding bolt 1.

According to one embodiment, the tensioning tool 10, as well as achieving the necessary force to cause the stretching of the corresponding bolt 1, also is configured to measure at least one of the "a", "b" or "c" distances described, so the control over the deformation undergone by the bolt 1 during the pre-tensioning or clamping is total and immediate, ensuring proper pre-tensioning of the bolt 1, preventing the bolt 1 from becoming overly deformed, i.e. undergoing plastic deformation.

As explained above, there are three displacements that occur during the tensioning of a bolt 1, and at least one of them should be controlled:

Displacement "a" (represented by dimension "a" in FIG. 3B).—Convergence between wedges 5a and 5b when an external force is applied.

Displacement "b" (represented by dimension "b" in FIG. 3B).—Increase in the distance between the inserts 7a and 7b in which the threaded ends of the bolt are inserted, i.e. increase in the distance between the parts 2a and 2b to be joined.

Displacement "c" (represented by dimension "c" in FIG. 3B).—Reduction in the relative distance between the outer facing surfaces 5d of the wedges 5a and 5b and the outer facing surfaces 6b of the washers 6 in a direction corresponding to the direction of the applied force F1.

As mentioned above, the two wedges 5a and 5b of the double wedge 5 of the pre-tensioning element 3 cooperate with the slanting sides 6a of the washers 6 disposed at either end of the pre-tensioning element 3. Thus, when the two wedges 5a and 5b converge/move nearer one another, distance "a" shown in FIG. 3B is shortened, and the corresponding washers 6 are separated, pushed by the wedges 5a and 5b, increasing distance "b" as shown in FIG. 3B. Hence the parts to be joined with the bolts 1, i.e. the two halves of a blade in the example embodiment of the invention, tend to move apart so that the bolt 1 is stretched, with the desired preloading being obtained with that stretching.

According to one embodiment, distance "a" is measured with the tensioning tool 10 which in turn imparts the necessary force to cause the stretching or pre-tensioning of the corresponding bolt 1, so as to control the stretching of the bolt 1, as will be described in detail below.

Figure 5:
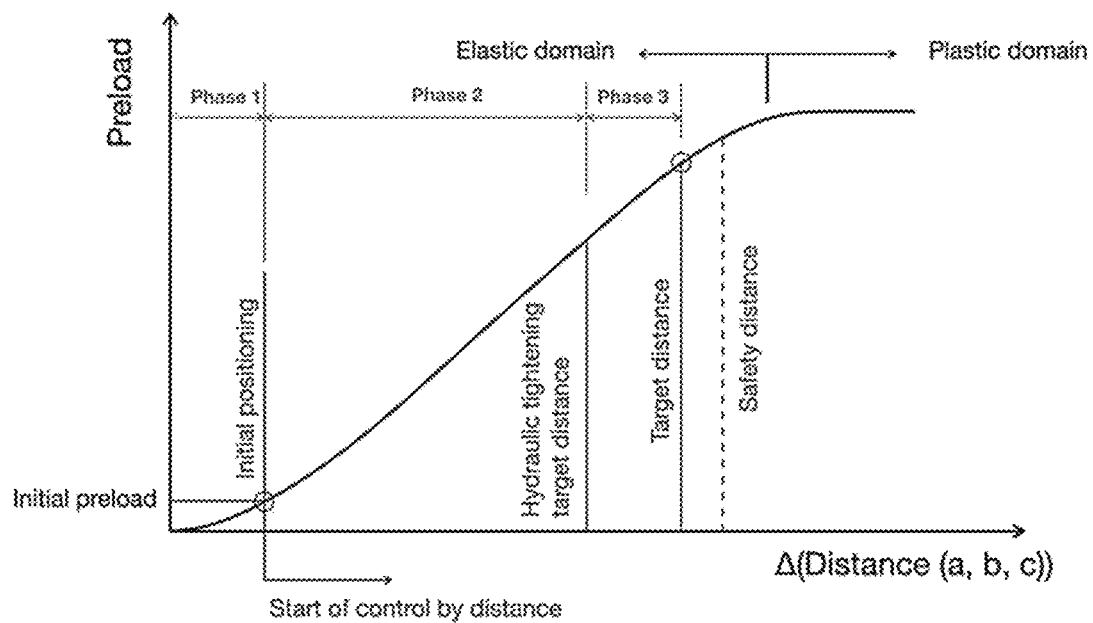
FIG. 5 is a graph of the load acquired by a bolt according to a displacement undergone.

Pre-tensioning of the bolts 1 is carry out in three phases as shown in FIG. 5, with the phases of the deformation or elongation of the bolt 1 during the pre-tensioning operation comprising:

Phase 1: Non-linear pre-tightening phase.

Phase 2: Deformation of the bolt 1 until an intermediate preloading is attained.

Phase 3: Deformation of the bolt 1 and torque control up to the final preloading.

The wedges 5a and 5b of the double wedge 5 are joined together by fasteners 8, preferably screws, as shown for example in FIG. 3A, allowing relative movement between the two wedges.

In one non-limiting example, when the clamping elements 8 are rotated in a first direction, the two wedges 5a and 5b of the double wedge 5 will move nearer one another, guided by the clamping elements 8, and when they are turned in a second direction opposite the first direction, the two wedges will move apart from each other.

Figures 4A, 4B:
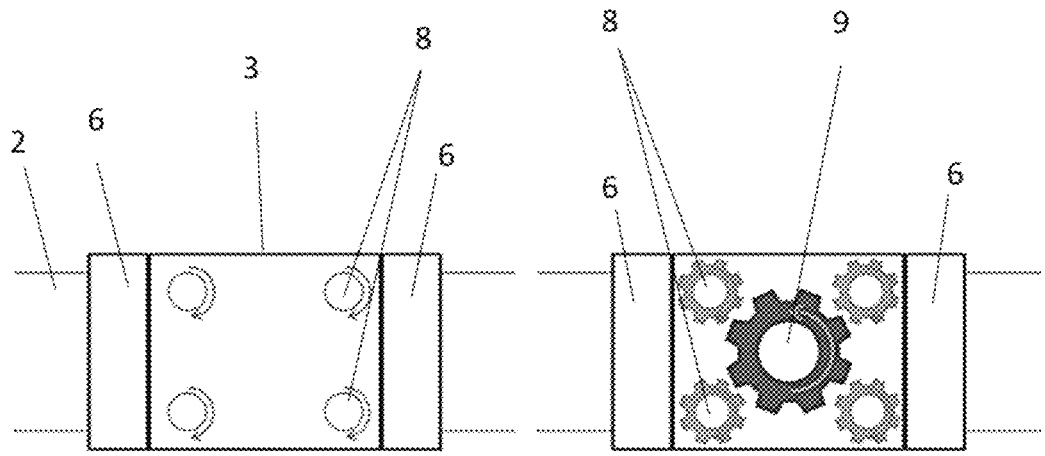
FIGS. 4A and 4B show two embodiments for tightening a connecting element of a pre-tensioning device.

FIG. 4A shows how the tensioning may be performed sequentially on all the clamping elements 8. Alternatively, the tensioning may be performed simultaneously as shown in FIG. 4B, with a rotating cog-like add-on 9 that acts simultaneously on cog-like heads of the clamping elements 8 of the pre-tensioning element 3.

In the example of FIGS. 2A and 2B, where the two blades 2a and 2b are joined with a plurality of bolts 1, the bolts 1 are pre-tensioned, with, for example, a distance "a" between the wedges 5a and 5b of each double wedge 5 being measured, in a prior positioning phase conducted with a device, not shown in the drawings, which places the tensioning tools 10 for all of the bolts 1 in the same initial position.

There are two example embodiments for the configuration of the tensioning tool: hydraulic actuators or electric actuators.

Figure 6:
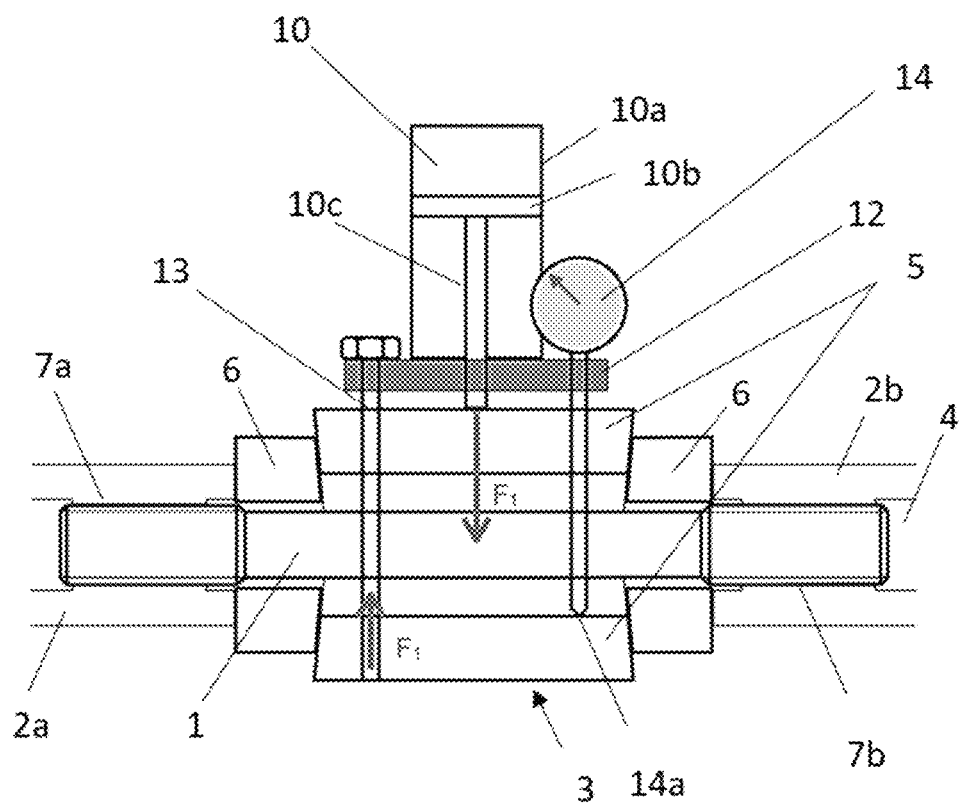
FIG. 6 shows an example configuration of a hydraulic tensioning tool.

According to one embodiment a hydraulically actuated tensioning tool is used that acts simultaneously on the two wedges 5a and 5b of the double wedge 5, as shown in FIG. 6. The upper and lower wedges 5a and 5b move simultaneously so as to move nearer one another in a coordinated way.

According to another embodiment an electrically actuated tensioning tool is used, the connecting elements may be acted upon either independently or jointly as respectively shown in FIGS. 4A and 4B. The steps in the case of an electrically actuated tensioning tool are as follows: 1st, force control, 2nd and 3rd, control of electrically assisted displacement.

FIG. 5 shows the three tightening phases described above. The non-linear phase at the start that is conducted by a positioning tool, the phase for controlling the deformation in the bolt 1 with a hydraulic or electrical actuator, and the third phase which controls the deformation of the bolt 1 by applying tightening torque (hydraulically or electrically) to reduce the distance between the wedges 5a and 5b.

According to one embodiment, the tensioning tool 10 is hydraulically driven. As shown in FIG. 6, the tensioning tool 10 comprises a hydraulic cylinder 10a, preferably single-acting, comprising a piston 10b that acts on the top of the pre-tensioning element 3, i.e. on the upper wedge 5a. The body of the cylinder, i.e. the case, is connected with an interface plate 12 and clamping elements 13, fitted temporarily, to the lower wedge of the pre-tensioning element 3. As the piston 10b of the hydraulic cylinder travels downward, the upper wedge 5a is pushed by a rod 10c attached to the piston 10b, and the interface plate 12 rises, pulling the lower wedge in a coordinated way. The reduction in distance "a" between the two wedges 5a and 5b is measured by a dial indicator 14, which is linked to one of the wedges 5a and 5b, preferably the upper wedge 5a, via an interface plate 12, and whose measuring tip 14a is in contact with a part of the lower wedge 5b.

Once the corresponding bolt 1 has been stretched or pre-tensioned as desired, the clamping elements 13 are removed as the corresponding tensioning tool 10 is removed. Though it is not necessary to fit the wedges of the double wedge 5 back together (as after the pre-tensioning operation the assembly formed by the double wedge 5, the washers 6 and the parts 2 to be joined is highly stable), optionally, additional clamping elements 8, such as screws, may be fitted permanently to hold the wedges 5a and 5b together.

What is claimed is:

1. An apparatus for tensioning a bolt that joins a first part and a second part, the bolt including a first threaded end threaded with a first threaded insert of the first part and a second threaded end threaded with a second threaded insert of the second part, the bolt having a longitudinal axis, the apparatus comprising:

a first wedge located on a first side of the longitudinal axis of the bolt, the first wedge having at least one side surface slanting in a first direction along the longitudinal axis;

a second wedge located on a second side of the longitudinal axis of the bolt, the second wedge having at least one side surface slanting in a second direction along the longitudinal axis, the first and second wedges being separated by a first distance, the apparatus being configured such that as the first distance is reduced, a second distance between the first and second parts increases;

at least first and second clamping elements that are each configured to act on the first and second wedges to cause the first and second wedge each to slide along the respective slanting side surface to be moved nearer one another to decrease the first distance; and a tensioning tool that is configured to act on the first and second clamping elements to cause a force to be applied to at least one of the first and second wedges to cause a decrease in the first distance to move the first and second wedges nearer one another and to increase the second distance, the tensioning tool being configured to control the application of the force to the at least one of the first and second wedges based on a measured value of one or both of the first and second distances.

2. The apparatus according to claim 1, wherein the tensioning tool is configured to measure one or both of the first and second distances as the force is applied to the at least one of the first and second wedges.

3. The apparatus according to claim 1, wherein the tensioning tool is configured to tension the bolt in first, second and third sequential phases, the first phase including a non-linear tensioning of the bolt, the second phase including a deformation of the bolt, the third phase including a continued deformation of the bolt until a final tensioning of the bolt is achieved.

4. The apparatus according to claim 1, wherein the tensioning tool is configured to sequentially act on the first and second clamping elements to cause the force to be applied to the at least one of the first and second wedges.

5. The apparatus according to claim 1, wherein the tensioning tool is configured to simultaneously act on the first and second clamping elements to cause the force to be applied to the at least one of the first and second wedges.

6. The apparatus according to claim 5, wherein each of the first and second clamping elements has a threaded portion and a cog head, the threaded portion of each of the first and second clamping elements being in engagement with a respective first and second threaded portion of the second wedge, the cog head of the first and second clamping elements being respectively in contact with a surface of the first wedge, the tensioning tool including a cog part that simultaneously engages with each of the first and second cog heads, the cog part of the tensioning tool being rotatable to cause the threaded portion of each of the first and second clamping elements to engage with a respective one of the first and second threaded portions of the second wedge to cause the force to be applied to the at least one of the first and second wedges.

7. The apparatus according to claim 1, further comprising at least third and fourth clamping elements that are each configured to act on the first and second wedges to cause the first and second wedges to be moved nearer one another to decrease the first distance, the tensioning tool being configured to simultaneously act on the first, second, third and fourth clamping elements to cause the force to be applied to the at least one of the first and second wedges.

8. The apparatus of claim 1, wherein the tensioning tool is hydraulically or electrically driven.

9. The apparatus according to claim 1, wherein the tensioning tool comprises a hydraulic cylinder, a piston moveable within the cylinder and a rod extending from one side of the piston, the rod having an end that is configured to act on an outer facing surface of the first wedge.

10. The apparatus according to claim 9, further comprising an interface plate coupled to the hydraulic cylinder, the interface plate being coupled to the second wedge by one or more screws that engage with a respective one or more threaded portions of the second wedge so that as the piston of the hydraulic cylinder travels towards the first wedge, the rod acts on the outer surface of the first wedge to cause the first and second wedges to be moved nearer one another to decrease the first distance.

11. The apparatus according to claim 1, wherein the first distance is measure by a dial indicator that is coupled to the first wedge, the dial indicator having a measuring tip that rests on a surface of the second wedge.

12. An apparatus for tensioning a bolt that joins a first part and a second part, the bolt including a first threaded end threaded with a first threaded insert of the first part and a second threaded end threaded with a second threaded insert of the second part, the bolt having a longitudinal axis, the apparatus comprising:
a first wedge located on a first side of the longitudinal axis of the bolt, the first wedge having an outer facing surface and at least one side surface slanting in a first direction along the longitudinal axis;
a second wedge located on a second side of the longitudinal axis of the bolt, the second wedge having an outer facing surface and at least one side surface slanting in a second direction along the longitudinal axis, the first and second wedges being separated by a first distance, the apparatus being configured such that as the first distance is reduced, a second distance between the first and second parts increases;
a first washer located between the first threaded insert and the at least one slanting side surface of each of the first and second wedges, the first washer having an outer facing surface that is spaced a third distance apart from the outer facing surface of the first wedge;
a second washer located between the second threaded insert and a second side of each of the first and second wedges;
at least first and second clamping elements that are each configured to act on the first and second wedges to cause the first and second wedges to be moved nearer one another to decrease the first distance; and
a tensioning tool that is configured to act on the first and second clamping elements to cause a force to be applied to at least one of the first and second wedges to cause a reduction in the first distance to move the first and second wedges nearer one another, to cause an increase in the second distance and to cause a decrease in the third distance, the tensioning tool being configured to control the application of the force to the at least one of the first and second wedges based on a measured value of one or more of the first, second and third distances.

13. The apparatus according to claim 12, wherein the tensioning tool is configured to measure one or more of the first, second and third distances as the force is applied to the at least one of the first and second wedges.

14. The apparatus according to claim 12, wherein the tensioning tool is configured to tension the bolt in first, second and third sequential phases, the first phase including a non-linear tensioning of the bolt, the second phase including a deformation of the bolt, the third phase including a continued deformation of the bolt until a final tensioning of the bolt is achieved.

15. The apparatus according to claim 12, wherein the tensioning tool is configured to sequentially act on the first and second clamping elements to cause the force to be applied to the at least one of the first and second wedges.

16. The apparatus according to claim 12, wherein the tensioning tool being configured to simultaneously act on the first and second clamping elements to cause the force to be applied to the at least one of the first and second wedges.

17. The apparatus according to claim 16, wherein each of the first and second clamping elements has a threaded portion and a cog head, the threaded portion of each of the first and second clamping elements being in engagement with a respective first and second threaded portion of the second wedge, the cog head of the first and second clamping elements being respectively in contact with a surface of the first wedge, the tensioning tool including a cog part that simultaneously engages with each of the first and second cog heads, the cog part of the tensioning tool being rotatable to cause the threaded portion of each of the first and second clamping elements to engage with a respective one of the first and second threaded portions of the second wedge to cause the force to be applied to the at least one of the first and second wedges.

18. The apparatus according to claim 12, further comprising at least third and fourth clamping elements that are each configured to act on the first and second wedges to cause the first and second wedges to be moved nearer one another to decrease the first distance and the third distance, the tensioning tool being configured to simultaneously act on the first, second, third and fourth clamping elements to cause the force to be applied to the at least one of the first and second wedges.

19. The apparatus according to claim 12, wherein the tensioning tool comprises a hydraulic cylinder, a piston moveable within the cylinder and a rod extending from one side of the piston, the rod having an end that is configured to act on the outer facing surface of the first wedge.

20. The apparatus according to claim 19, further comprising an interface plate coupled to the hydraulic cylinder, the interface plate being coupled to the second wedge by one or more screws that engage with a respective one or more threaded portions of the second wedge so that as the piston of the hydraulic cylinder travels towards the first wedge, the rod acts on the outer surface of the first wedge to cause the first and second wedges to be moved nearer one another to decrease the first distance and the third distance.

21. A method for tensioning a bolt that joins a first part and a second part, the bolt including a first threaded end threaded with a first threaded insert of the first part and a second threaded end threaded with a second threaded insert of the second part, the bolt having a longitudinal axis, there being a first wedge located on a first side of the longitudinal axis of the bolt, the first wedge having at least one side surface slanting in a first direction along the longitudinal axis and a second wedge located on a second side of the longitudinal axis of the bolt, the second wedge having at least one side surface slanting in a first direction along the longitudinal axis, the first and second wedges being separated by a first distance, the bolt, first threaded insert, second threaded insert, first wedge and second wedge being arranged such that as the first distance is reduced, a second distance between the first and second parts increases, the method comprising:

applying a force to at least one of the first and second wedges to cause a decrease in the first distance to move the first and second wedges along the slanting side surfaces nearer one another and to increase the second distance, the application of the force to the at least one of the first and second wedges being controlled based on a measured value of one or both of the first and second distances.

\* \* \* \* \*